(12) United States Patent
van Kessel

(10) Patent No.: US 6,712,012 B1
(45) Date of Patent: Mar. 30, 2004

(54) CONTROL SYSTEM FOR AN INCINERATION PLANT, SUCH AS FOR INSTANCE A REFUSE INCINERATION PLANT

(75) Inventor: Lambertus Bernardus Maria van Kessel, Apeldoorn (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 80 days.

(21) Appl. No.: 10/089,744
(22) PCT Filed: Oct. 4, 2000
(86) PCT No.: PCT/NL00/00713
§ 371 (c)(1),
(2), (4) Date: Sep. 3, 2002
(87) PCT Pub. No.: WO01/25690
PCT Pub. Date: Apr. 12, 2001

(30) Foreign Application Priority Data

Oct. 4, 1999 (NL) .............................................. 1013209

(51) Int. Cl.⁷ .............................. F23G 5/50; F23N 5/18
(52) U.S. Cl. ..................... 110/346; 110/188; 110/185; 110/186
(58) Field of Search ...................... 431/12, 76; 122/379, 122/480; 60/664, 667; 110/185, 186, 188, 234, 346

(56) References Cited

U.S. PATENT DOCUMENTS

| 4,253,308 A | * | 3/1981 | Eggenberger et al. ......... 60/664 |
| 4,486,165 A | * | 12/1984 | Usami et al. .................. 431/76 |
| 4,887,431 A | * | 12/1989 | Peet ............................. 60/667 |
| 4,895,082 A | * | 1/1990 | Mindermann et al. ...... 110/186 |
| 4,909,037 A | * | 3/1990 | Hubby ......................... 60/664 |
| 4,984,524 A | * | 1/1991 | Minderman et al. ........ 110/346 |
| 5,230,293 A | * | 7/1993 | Schirmer ..................... 110/346 |
| 5,261,337 A | * | 11/1993 | Orita et al. .................. 110/346 |
| 5,279,263 A | * | 1/1994 | Cameau et al. ............. 122/480 |
| 6,145,453 A | * | 11/2000 | Martin et al. ................ 110/346 |

FOREIGN PATENT DOCUMENTS

EP        263 195 A1       4/1988

* cited by examiner

Primary Examiner—K. B. Rinehart
(74) Attorney, Agent, or Firm—Hoffmann & Baron, LLP

(57) ABSTRACT

A control system for an incineration plant, comprising an incineration furnace with a combustion path along which the material to be burned is transported, air supply means, a steam generator, and control means with a steam controller and an oxygen controller which, depending on respectively the generated amount of steam and the oxygen in the furnace, generate control signals for adjusting the size and/or speed of a stream of material in the furnace and/or adjusting the air supplied. The control signals control the generated amount of steam to a first adjusting value and via air supplied the amount of oxygen to a second adjusting value. The steam controller controls a summing device which forms a sum signal used which via calculating means modifies the output signals of control circuits controlled by the output signal of the oxygen controller for the air supply to the furnace and/or the size of the supply stream of material to the furnace and the speed of the stream of material through the furnace respectively, to obtain definitive control signals.

13 Claims, 2 Drawing Sheets

CONTROL SYSTEM FOR AN INCINERATION PLANT, SUCH AS FOR INSTANCE A REFUSE INCINERATION PLANT

This is application is the U.S. National Application Number PCT/NL00/00713 filed on Oct. 4, 2000, which is incorporated herein by reference.

BACKGROUND OF THE INVENTION

The invention relates to a control system for an incineration plant, such as for instance a refuse incineration plant.

SUMMARY OF THE INVENTION

The invention relates to a control system for an incineration plant, such as for instance a refuse incineration plant, comprising an incineration furnace with an inlet for supplying material to be burned, an outlet for discharging burned material, a combustion path extending between the inlet and the outlet, and along which, in use, the material is transported in a direction of transport from the inlet to the outlet for combustion of the material, and air supply means for supplying air to the combustion path, the incineration plant further being provided with a steam generator for generating steam by means of heat generated in the furnace and control means comprising a steam controller and an oxygen controller which, depending on respectively the amount of steam generated by the steam generator and the amount of oxygen in the furnace, generate one or more control signals for adjusting the size and/or speed of a supply stream of the amount of material respectively to and through the furnace and/or for adjusting the amount of air supplied to the furnace by means of the air supply means, the control means adjusting the signals such that the steam generator generates an amount of steam per time unit which optimally corresponds with a first predetermined adjusting value, and that the air supply means supply such an amount of air that an amount of oxygen is contained in the furnace which optimally corresponds with a second predetermined adjusting value. Such a system is known from practice and is, inter alia, used in the refuse incineration plants built by the firm of Von Roll. One of the problems occurring during refuse incineration is constituted by the fluctuations in the process caused by the continuously changing refuse composition. Strong fluctuations in the refuse composition and thus in the energetic power supplied may result in strong process fluctuations, such as fluctuations in the temperature of the furnace. Such process fluctuations may be harmful to the plant. Also, the process fluctuations may involve product fluctuations, such as fluctuations in the amount of steam produced or the electricity generated therewith. This has the result that the yield and quality of these products is reduced. In the known control system, to provide a solution for the problems described, control means are used which generate the at least one control signal to adjust the size and/or speed of the stream of the amount of material through the furnace and/or to adjust the amount of air supplied to the furnace by means of air supply means. The control means serve to control the at least one control signal such that the above fluctuations are damped.

The known control means as used in the so-called Von Roll control reduce the above-described problems because the at least one control signal is formed as the sum of a signal provided by a steam controller and a signal provided by an oxygen controller, as a result of which excess oxygen in the furnace and deficient steam oppositely affect the control signal and therefore counterbalance each other to a certain degree as far as the control of the plant is concerned. Nevertheless, the known control system is not, or not sufficiently, capable of retaining the output variables steam and oxygen at the selected adjusting points.

There is therefore a need for an improved control system for an incineration plant. The object of the invention is to meet this need. According to the invention a control system of the above-described type is therefore characterized in that the output signal of the steam controller is supplied to a summing device for forming a sum signal used to modify via corresponding calculating means the output signals of control circuits controlled by the output signal of the oxygen controller for the air supply to the furnace and/or the size of the supply stream of material to the furnace and the speed of the stream of material through the furnace respectively, to obtain definitive control signals.

BRIEF DESCRIPTION OF THE DRAWINGS

The invention will be described below in more detail with reference to the accompanying drawings, in which.

DETAILED DESCRIPTION OF THE PREFERRED EMBODIMENTS

Figure 1:
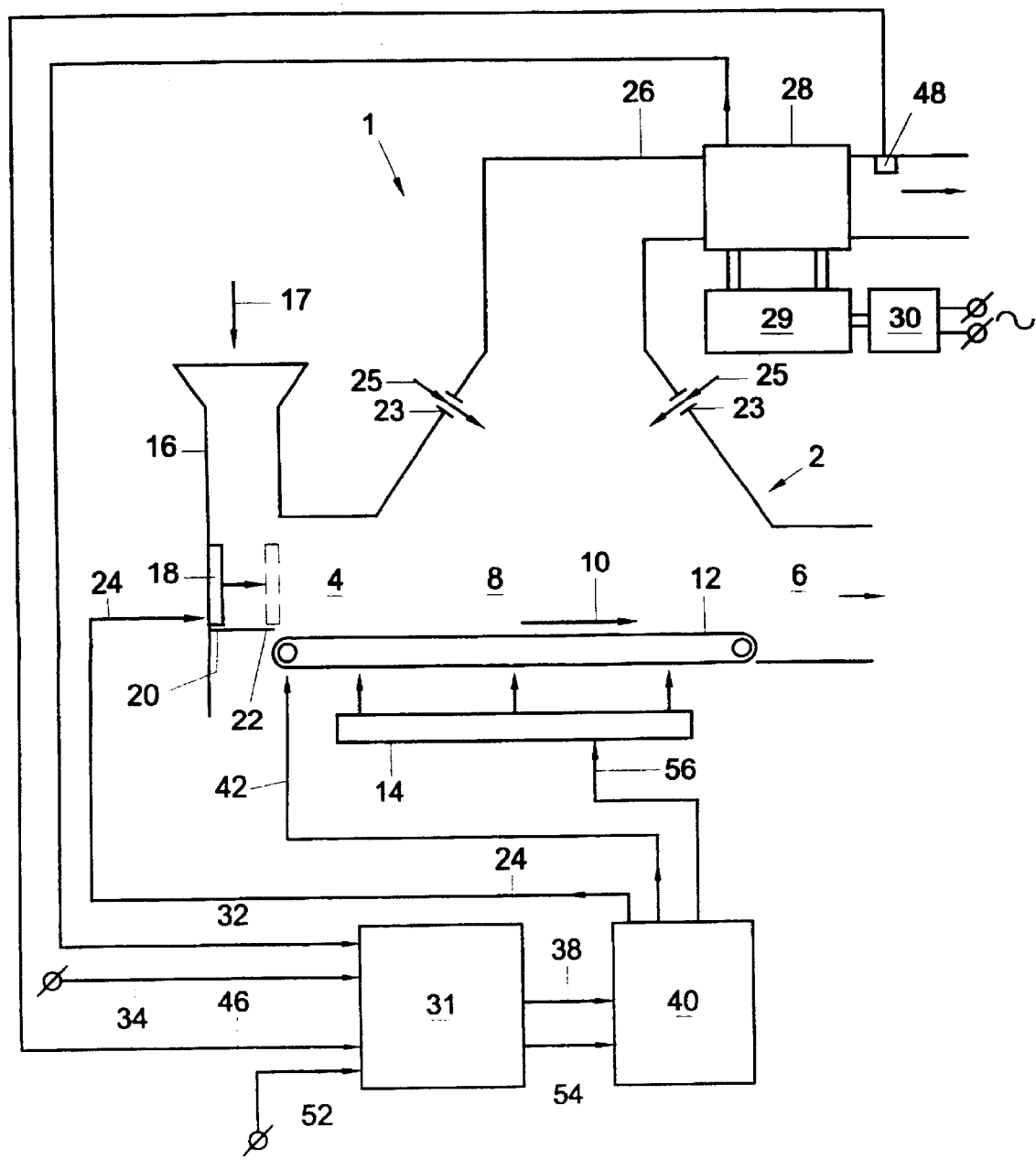
FIG. 1 diagrammatically shows an example of a refuse incineration plant provided with a control device, in which the invention can be used.

In FIG. 1 a possible embodiment of a plant for continuous thermal combustion of refuse is denoted by reference numeral 1. The plant comprises an incineration furnace 2 with an inlet zone 4 for supplying the refuse to be burned, an outlet zone 6 for discharging the burned refuse and a combustion path 8 extending between the inlet and the outlet, and along which, in use, the material to be burned is continuously transported in a direction of transport from the inlet zone to the outlet zone, as indicated by an arrow 10. The furnace is further provided with transport means 12, which may comprise, for instance, a grate for continuously or stepwise transporting the refuse in the direction of transport 10.

The system is further provided with air supply means 14 for supplying, preferably heated, air to the combustion path 8. Upstream of the inlet zone the furnace is provided with a chute 16 into which the refuse can be discharged, as indicated by an arrow 17. In the chute 16 there is further provided a supply or metering slide 18 which can move forward and backward between a first position 20 and a dotted second position 22. When the chute contains refuse, the supply slide can be moved from the first to the second position under control of a signal on line 24 so that refuse is introduced via the inlet zone 4 into the combustion path 8. Subsequently, the supply plate moves back to the first position. When returned to the first position, the supply plate can move to the second position again, if desired, to push more refuse into the furnace.

The furnace is further provided with a chimney 26 and a diagrammatically indicated heat exchanger which functions as steam generator 28, and which uses the heat developed in the furnace to generate steam. With the steam, for instance a turbine 29 can be driven, which in turn can drive a current generator 30.

The furnace is further provided with an inlet means 23 for controllably supplying secondary air 25.

In use, the furnace is therefore filled with refuse by means of the metering slide 18. This refuse is then moved slowly in the direction of transport by means of the transporting means 12. When the refuse is still in the furnace near the inlet zone, the refuse will be heated and evaporation will take place. The heating occurs partly because the furnace is already very hot through combustion of earlier supplied refuse and can be further promoted by supplying heated air by means of the air supply means 14. When the waste is further transported in the direction of transport, the refuse reaches the so-called main combustion zone. Here the major part of the refuse will burn. Subsequently, the refuse will be further transported in the direction of the outlet 6. The fire will then slowly become extinguished, and final combustion is reported. Eventually, the burned refuse will leave the furnace via the outlet 6. Because the heating value of the refuse can vary, the heat production in the furnace and thus the generation of steam and the consumption of oxygen can also strongly vary. To compensate for the influence of a variable heating value of the refuse, the system is further provided with a control device 31.

In this example the control device 31 is connected with the steam generator 28 via a line 32. However, the control device may also be connected with the current generator 30. The steam generator 28 generates on line 32 a signal which is a measure of the amount of steam generated by the steam generator 28. Furthermore, via a line 34 a first reference signal is supplied to the control device 31. This reference signal has a adjusting value corresponding with the target value of the amount of steam which the steam generator 28 is considered to deliver. The control device 31 compares the signal on line 32 with the signal on line 34. When these signals correspond with each other, the steam generator 28 generates the predetermined amount of steam. When it turns out, however, that the generated amount of steam is less than the adjusting value on line 34, the control device 31 generates a first control signal on line 38. The control signal on line 38 is supplied in this example to the control unit 40. When it is indicated on line 38 that the amount of steam produced is less than the adjusting value on line 34, the control unit 40 will control the metering slide 18 via line 24 such that more refuse is supplied to the furnace, which has the result that somewhat more refuse will burn and that the steam production therefore increases. When it subsequently turns out that the steam production actually reaches the adjusting value, the signals on lines 32 and 34 will become equal to each other and the control signal on line 38 generated by the control device 31 will go to zero again. Now the control unit 40 knows that the steam production is at the right level and will control the supply plate 18 via line 24 such that it keeps supplying refuse to the furnace at the increased speed. Further, because more refuse is supplied to the furnace, the control unit 40 will in this example increase the speed of the transport means 12 accordingly via a line 42. Per time unit more refuse is therefore passed through the furnace.

When the heating value of the refuse supplied to the furnace increases, the signal on line 32 will indicate that the steam generator 28 generates accordingly more steam. When thus more steam is generated than corresponds with the predetermined adjusting value on line 34, the control device 31 will generate on line 38 a signal negative in this example. The control unit will control the supply plate 18 in response thereto such that per time unit less refuse is supplied to the furnace. Also, via line 42 the rate of transport of the refuse through the furnace will be reduced accordingly. The above reductions will be carried out such that eventually on line 32 a signal is generated which corresponds with the adjusting value on line 34. This means that in that case the amount of steam generated by the steam generator 28 is equal to the predetermined adjusting value. The control unit is arranged such that a signal of the steam generator also affects the air supply, as will be apparent from the following.

In this example the control device 31 is further connected via a line 46 with an oxygen sensor 48, which in this example is located behind the steam generator, which oxygen sensor 48 detects the amount of oxygen in the furnace and provides a signal which is a measure of the amount of oxygen in the furnace.

Via a line 52 a second reference signal having a second adjusting value is supplied to the control device 31. This second adjusting value indicates the target value of the amount of oxygen considered to be present in a furnace. If, however, it turns out that the furnace contains more oxygen than corresponds with the second adjusting value, the control device 31 will generate on line 54 a signal which has the result that the control unit 40 controls the air supply means via a line 56 such that the amount of air supplied to the furnace decreases. Such a situation may occur for instance when refuse having a lower heating value is supplied to the furnace. Less oxygen is consumed, so that it is not necessary to supply excess air to the furnace. If it then turns out that a reduced supply of the amount of air causes the amount of oxygen in the furnace to decrease again to a value corresponding with the second adjusting value on line 52, the control device 31 will in this example generate on line 54 a signal having the value 0. At this signal the control unit 40 will maintain unchanged the amount of air supplied to the furnace by means of the air supply means 14. Quite analogously, the control device 31 will ensure that when the amount of oxygen in the furnace falls to below the second adjusting value, the amount of air supplied to the furnace by means of the air supply means 14 will be increased again until the amount of oxygen in the furnace corresponds with the second adjusting value again. The control unit is arranged such that a signal of the oxygen sensor also controls the metering slide and the rate of transport, as shown in FIG. 2.

Figure 2:
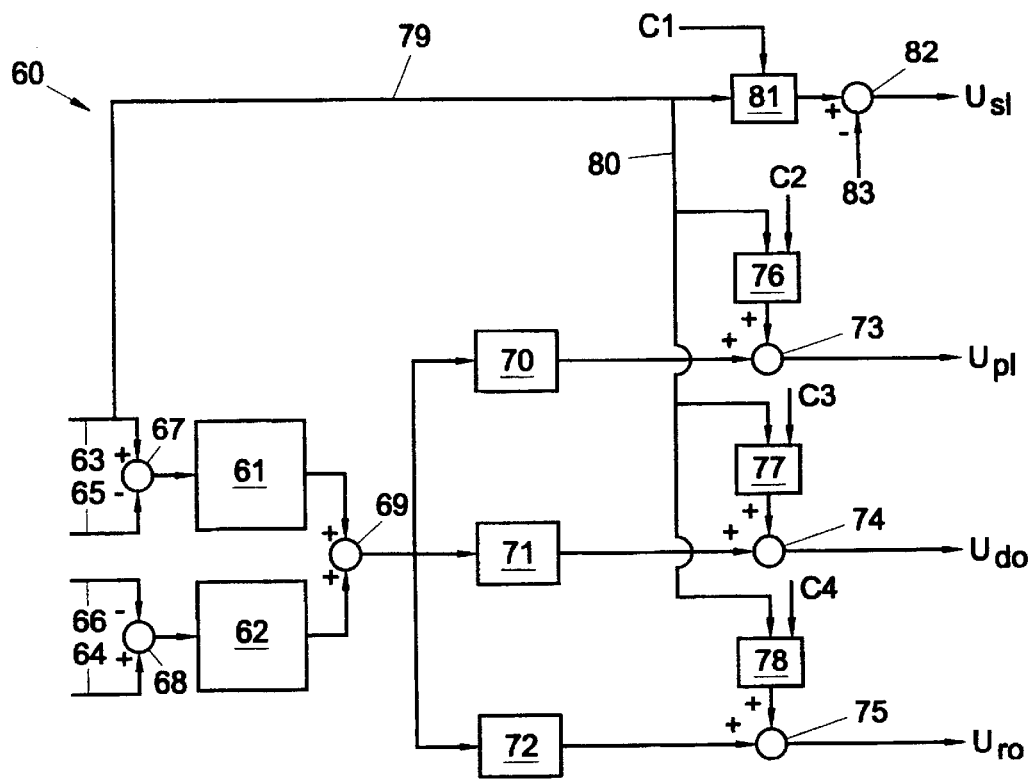
FIG. 2 shows a block diagram of a known control device for a refuse incineration plant.

FIG. 2 shows a block diagram of a known type of control device for a refuse incineration plant. The control device shown is standard used in Von Roll refuse incineration plants and is also designated as standard Von Roll control device. The device 60 shown comprises a steam controller 61 of the proportional and integrating type (PI controller) and an oxygen controller 62 of the proportional type (P controller). The controllers 61 and 62 receive input signals each formed from the difference between respectively a steam reference signal 63 and an oxygen reference signal 64, on the one hand, and respectively a signal 65 representing the amount of steam and a signal 66 representing the amount of oxygen in the furnace, on the other hand. To form the difference signals, suitable summing devices 67, 68 are provided.

The steam controller 61 and the oxygen controller 62 each form an output signal. These output signals are added in a summing device 69 and supplied to a number of control circuits of the proportional type. In this example three control circuits are used, that is to say a first control circuit 70 for controlling the primary air supply, a second control circuit 71 for controlling the movement of the metering slide, and a third control circuit 72 for controlling the rate of transport of the material to be burned on the grate for the material to be burned.

The control circuits form control signals which are each added to an output signal representing the working point value of the control signals. To this end, there are provided summing devices 73, 74, 75 and calculating means 76, 77, 78 for calculating the working point values of the control signals for the primary air, the metering slide, and the rate of transport.

The calculating means calculate the working point values starting from the steam reference signal supplied to the calculating means via a line 79, 80. The calculating means may further be provided with inputs for inputting adjusting constants C2, C3, C4.

The output signals of the summing devices 73. 74, 75 form the eventual control signals $U_{pl}$, $U_{do}$, $U_{ro}$ for the primary air, the metering slide, and the rate of transport. The control signals are supplied to known per se control means such as valves, motors etc., not shown.

There are further provided calculating means 81 which calculate the desired value of the total amount of air starting from the steam reference signal 63 supplied via line 79 and, if required, of a adjusting value C1.

The output signal of the calculating means 81 is reduced in a summing device 82 by a signal 83 representing the measured total amount of primary air, so that as a result a control signal $U_{sf}$ for the secondary air is obtained.

Figure 3:
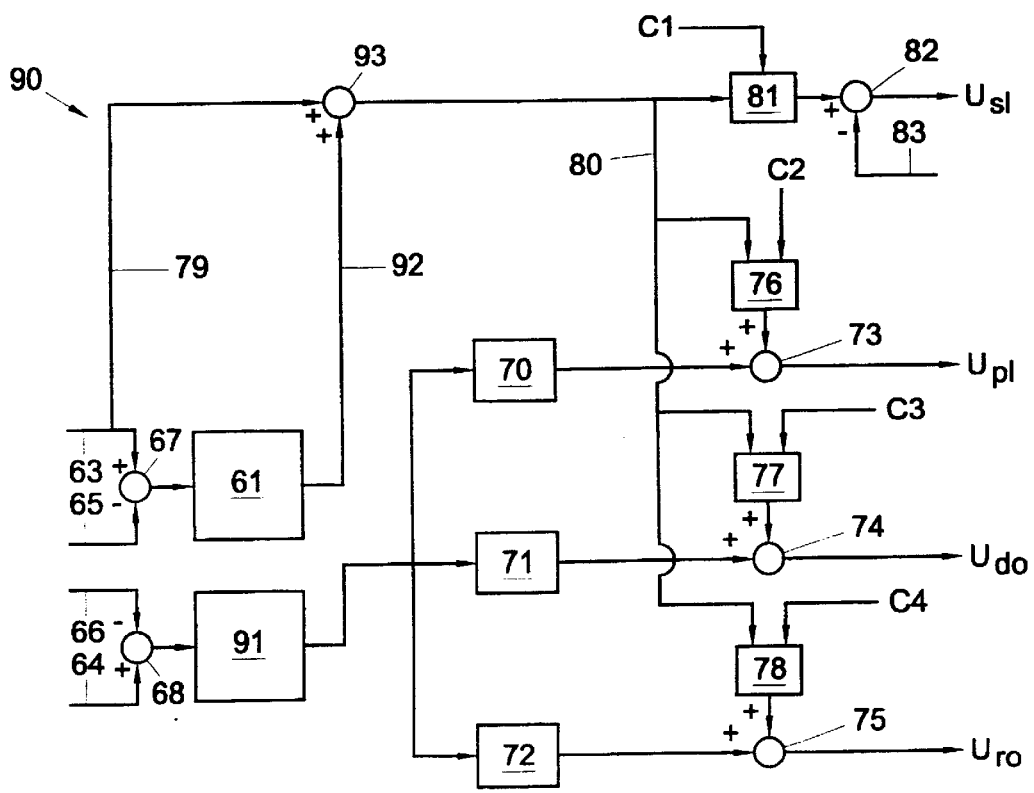
FIG. 3 shows an example of a block diagram of a control device according to the invention.

FIG. 3 diagrammatically shows an example of an improved control device 90 according to the invention. In FIG. 3 parts of the control device which correspond with parts of the control device of FIG. 2 are indicated by the same reference numerals. The control device of FIG. 3 differs from that of FIG. 2 in that the output signals of the steam controller and the oxygen controller are not added to each other. Moreover, the oxygen controller 91 is designed as PI control, the output signal of which controls the control circuits 70, 71 and 72.

The output signal of the steam controller 61 is supplied via a line 92 to a summing device 93 to which is also supplied the steam reference signal 63 via line 79. The summing signal of the steam control signal and the output signal of the PI steam controller is supplied again to the calculating means 76, 77, 78 and 81.

It is noted that after the foregoing modifications are obvious to those skilled in the art. Thus the described control device could also operate on the basis of a current signal with associated current reference signal, which current signal represents the current generated by a current generator, such as for instance the generator 30 of FIG. 1. Also, if desired, an oxygen controller of the P type could be used if a non-optimum control is acceptable. Furthermore, the control means for the metering slide and the rate of transport could be fixedly coupled together, so that only one combined control signal is required to replace the signals $U_{do}$ and $U_{ro}$.

Furthermore, the reference values for respectively the steam controller and the oxygen controller can be manually adjustable and/or adjustable through a safety device. Also, the control device can be implemented according to software and comprise a programmable control device, such as for instance a computer.

These and similar modifications are deemed to fall within the scope of the appended claims.

What is claimed is:

1. A method for controlling a refuse incineration plant provided with a steam generator, wherein signals are generated which represent the amount of oxygen in the furnace of the incineration plant and the amount of generated steam, and wherein target values for the amount of oxygen in the furnace and the amount of generated steam are adjustable and difference signals representing the difference between the target values and the generated values are formed, characterized in that the difference signal representing the difference between the target value for the generated steam and the corresponding adjusting value is subjected to an integrating treatment and is added to the target value for the generated steam and that the thus obtained sum signal is used to modify a number of control signals for the plant, to obtain definitive control signals.

2. A refuse incineration plant according to claim 1, characterized in that a signal representing the difference signal with respect to the oxygen in the furnace is subjected to an integrating treatment.

3. A refuse incineration plant according to claim 1, characterized in that the definitive control signals comprise at least one control signal for the air supply to the furnace, as well as a control signal affecting the material transport through the furnace.

4. A control system for an incineration plant, such as for instance a refuse incineration plant, comprising an incineration furnace with an inlet for supplying material to be burned, an outlet for discharging burned material, a combustion path extending between the inlet and the outlet, and along which, in use, the material is transported in a direction of transport from the inlet to the outlet for combustion of the material, and air supply means for supplying air to the combustion path, the incineration plant further being provided with a steam generator for generating steam by means of heat generated in the furnace and control means comprising a steam controller and an oxygen controller which, depending on respectively the amount of steam generated by the steam generator and the amount of oxygen in the furnace, generate one or more control signals for adjusting the size and/or speed of a supply stream of the amount of material respectively to and through the furnace and/or for adjusting the amount of air supplied to the furnace by means of the air supply means, the control means adjusting the control signals such that the steam generator generates an amount of steam per time unit which optimally corresponds with a first predetermined adjusting value, and that the air supply means supply such an amount of air that an amount of oxygen is contained in the furnace which optimally corresponds with a second predetermined adjusting value, characterized in that the output signal of the steam controller is supplied to a summing device for forming a sum signal which is used to modify via corresponding calculating means the output signals of control circuits controlled by the output signal of the oxygen controller for the air supply to the furnace and/or the size of the supply stream of material to the furnace and the speed of the stream of material through the furnace respectively, to obtain definitive control signals.

5. A control system according to claim 4, characterized in that the oxygen controller is a proportional and integrating controller.

6. A system according to claim 4, characterized in that the steam controller is replaced by a corresponding controller for a parameter equivalent to the amount of steam produced.

7. A control system according to claim 6, characterized in that the steam generator drives a current generator via a turbine and that as corresponding controller a current controller is used which reacts to the amount of electric current produced by means of the steam produced.

8. A control system according to claim 4, characterized in that the controls system is designed at least partly as software, which part designed a software, in operation, controls the incineration plant by means of a programmable device.

9. A control system according to claim 4, characterized in that the adjusting values are manually adjustable.

10. A control system according to claim 4, characterized in that the adjusting values are adjustable by a safety device.

11. A refuse incineration plant, characterized by a control system according to claim 4.

12. A refuse incineration plant according to claim 11, characterized in that the control signals are formed starting from the difference between a target value for the amount of oxygen in the furnace and the actual value of the amount of oxygen in the furnace.

13. A refuse incineration plant according to claim 11, characterized in that the definitive control signals comprise at least one control signal for the air supply to the furnace, as well as a control signal affecting the material transport through the furnace.

* * * * *

UNITED STATES PATENT AND TRADEMARK OFFICE
CERTIFICATE OF CORRECTION

PATENT NO. : 6,712,012 B1
DATED : March 30, 2004
INVENTOR(S) : van Kessel

It is certified that error appears in the above-identified patent and that said Letters Patent is hereby corrected as shown below:

Column 6,
Line 55, now reads "A system" should read -- A control system --

Signed and Sealed this

Twentieth Day of July, 2004

JON W. DUDAS
*Acting Director of the United States Patent and Trademark Office*